Figure 1:
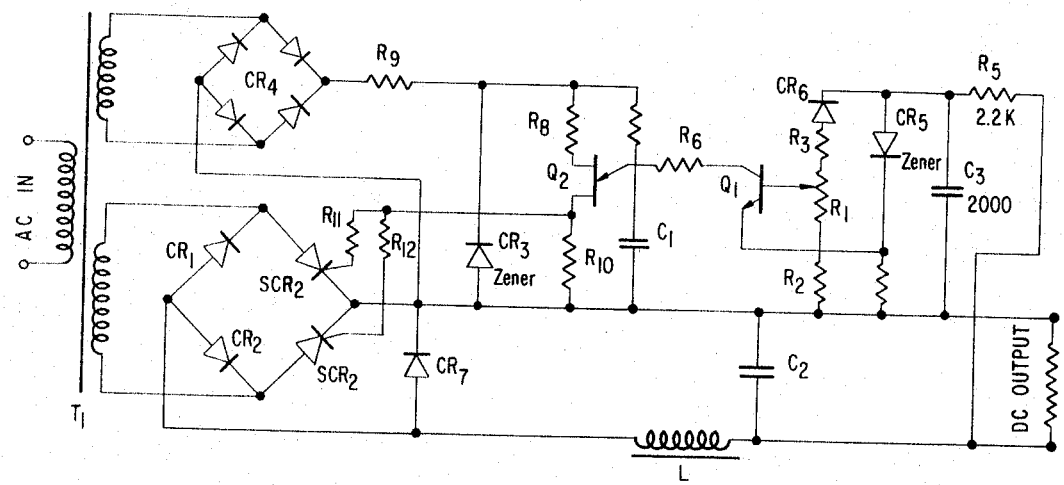

May 16, 1967 B. KRUGER 3,320,512
REGULATED POWER SUPPLY WITH HIGH SPEED TRANSIENT RESPONSE
Filed Nov. 13, 1963 2 Sheets-Sheet 1

INVENTOR.
BODO KRUGER
BY
Sughrue, Rothwell, Mion & Zinn
ATTORNEYS

United States Patent Office 3,320,512
Patented May 16, 1967

3,320,512
REGULATED POWER SUPPLY WITH HIGH SPEED TRANSIENT RESPONSE
Bodo Kruger, Severna Park, Md., assignor to Martin Marietta Corporation, New York, N.Y., a corporation of Maryland
Filed Nov. 13, 1963, Ser. No. 323,429
4 Claims. (Cl. 321—10)

This invention relates generally to a regulated power supply and more particularly to a phase controlled, regulated power supply with an improved load regulating circuit having high speed transient response.

In the prior art, phase delay or integrating circuits have been connected in the regulator feedback loop of phase controlled, regulated power supplies in an attempt to eliminate system instability. Such an arrangement improves system stability by reducing the tendency to hunt from one-half cycle to the next and the resulting non-symmetrical conduction during alternate half cycles. However, this result is obtained only at the expense of system response.

Therefore, the principal object of this invention is to provide an improved regulated power supply having high speed transient response.

Another object is to provide a phase controlled power supply system having an improved regulating circuit which eliminates overshooting and provides stable operation over a wide range of input and output voltages.

A more specific object of this invention is to provide a phase controlled, regulated power supply system with a phase advancing feedback loop to produce high speed system response to transients.

Another specific object of this invention is to provide a phase controlled, regulated power supply system with both a phase advancing feedback loop and another phase shifting feedback loop to produce stable operation over a wide range of input and output voltages.

The foregoing objects and other advantages of this invention are accomplished in a preferred embodiment thereof by providing a phase controlled, silicon controlled rectifier bridge circuit for converting an A.C. input voltage to a D.C. voltage. This D.C. voltage is smoothed by an LC filter to provide a D.C. output voltage. The silicon controlled rectifiers are fired by means of gating pulses produced by a transistor blocking oscillator. The frequency of operation of the oscillator is controlled by means of three feedback loops. The first feedback loop senses variations in the D.C. output voltage and applies a correcting D.C. voltage to the oscillator. The second feedback loop comprises a phase advancing capacitor which supplies to the oscillator a correcting signal which is responsive to the transient or slope of the variations in D.C. output voltage. The third feedback loop is a phase shifting RC network which senses variations in the D.C. voltage at the output of the bridge circuit and eliminates instability which may be caused by a phase shift approaching 180° introduced by the LC smoothing filter. The circuit could also be designed for constant current regulation.

Figure 2:
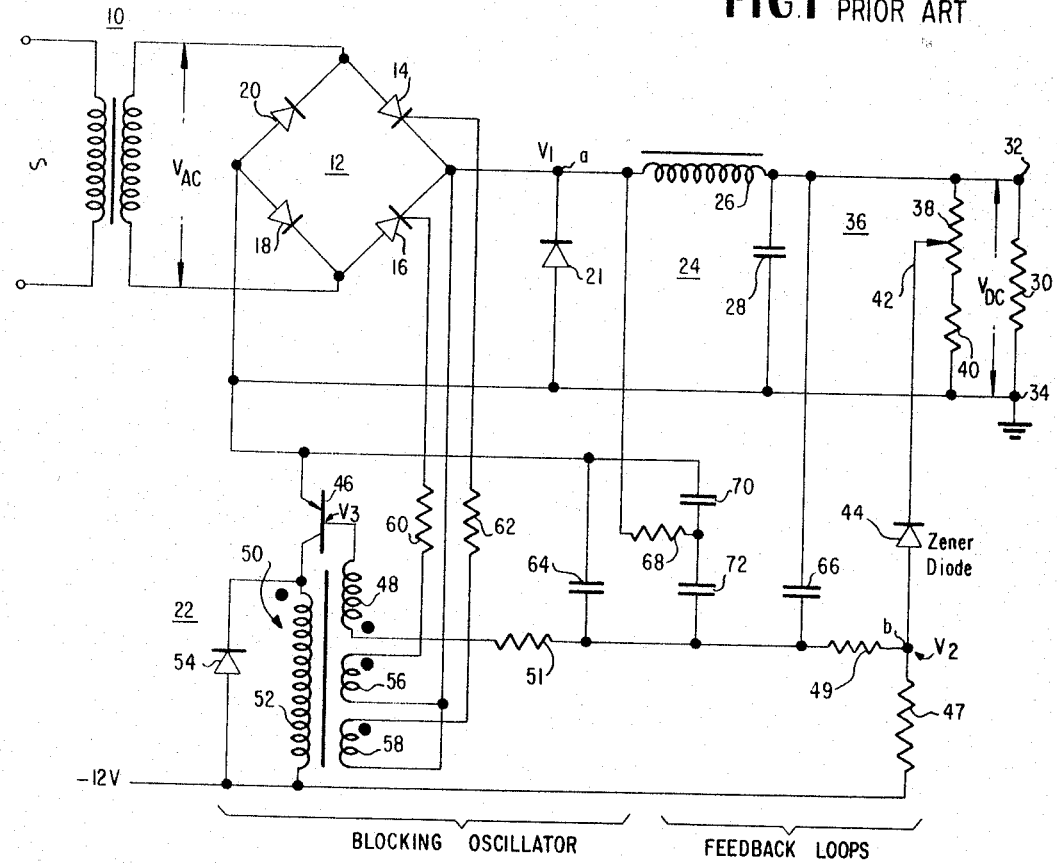
Figure 3:
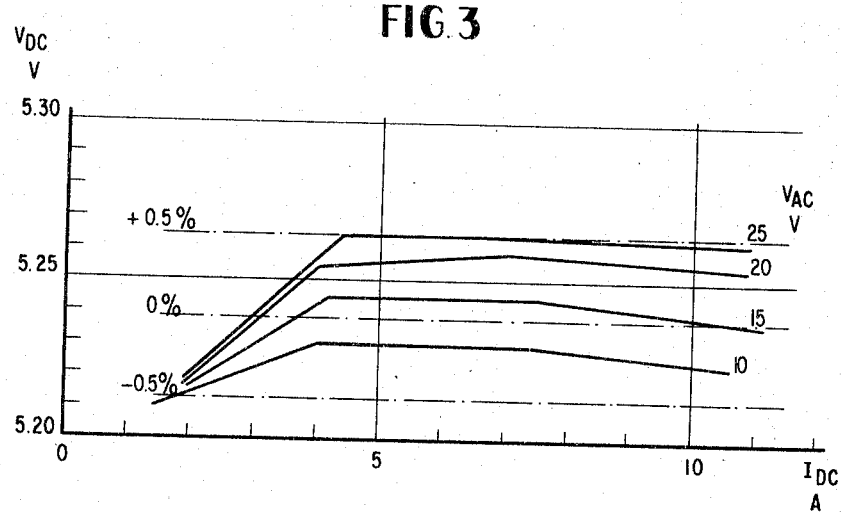
Figure 4:
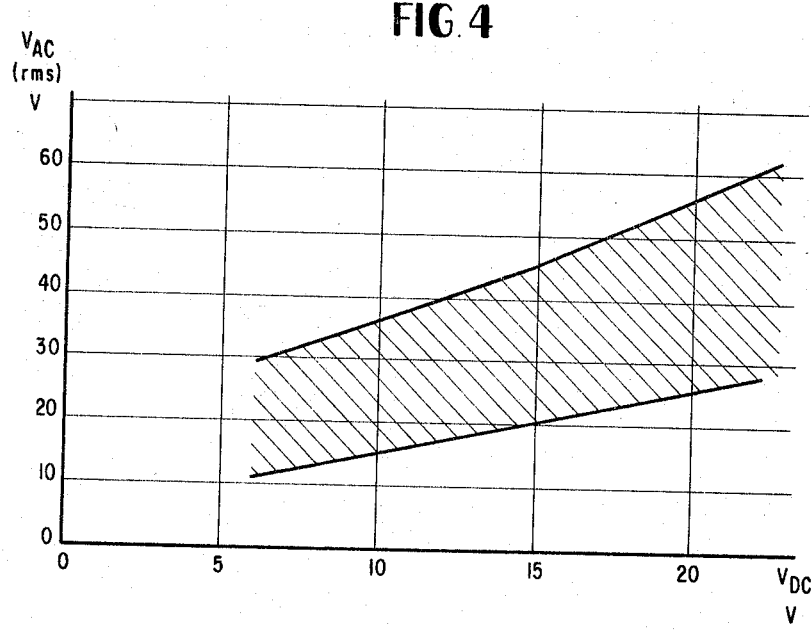

Other objects and advantages will become apparent from the following description and accompanying drawing in which:

FIGURE 1 is a schematic diagram of a typical prior art regulated power supply;
FIGURE 2 is a schematic diagram of a preferred embodiment of the regulated power supply of this invention;
FIGURE 3 is a graph showing the extremely high regulation obtained by the circuit of FIGURE 2; and
FIGURE 4 is a graph showing the region of stable operation obtained by the circuit of FIGURE 2 for wide ranges of input and output voltages.

FIGURE 1 shows a typical prior art phase controlled, regulated power supply. An admitted problem with this type of circuit is its instability when the output ripple voltage exceeds a certain value. The circuit tends to hunt from one-half cycle to the next resulting in non-symmetrical conduction during alternate half cycles. Instability in such a circuit is reduced by incorporating the phase delaying or integrating capacitor $C_3$. However, it can be seen that the integrating network including the capacitor $C_3$ and the resistor $R_5$ has a time constant in the order of seconds, thereby resulting in a considerable lag in the response of the regulating circuit to variations in the D.C. output voltage. Such a lag causes overshooting since the correcting effect of the feedback circuit always considerably lags the actual variation in the D.C. output voltage.

In the preferred embodiment of this invention as illustrated in FIGURE 2, the response of the voltage regulating circuit is increased to less than one-half cycle. Looking at this preferred circuit in detail, we see that a source of A.C. power is applied to a power transformer 10 whose output is applied across a phase controlled switching bridge 12 which rectifies the A.C. input voltage to produce at point $a$ a D.C. voltage $V_1$.

The bridge comprises a pair of silicon controlled rectifiers 14 and 16 and a pair of diode rectifiers 18 and 20. The gate electrodes of the SCR's are connected to the output of a blocking oscillator 22 which provides appropriately timed firing pulses to the gate electrodes to render each SCR conducting on alternate cycles of the A.C. voltage $V_{AC}$ appearing across the secondary of power transformer 10. As is well known in such regulated power supplies, the D.C. output voltage is thereby controlled in accordance with the time at which the SCR's are fired with respect to the half cycles of $V_{AC}$ applied across bridge circuit 12.

Connected to the output of the bridge circuit is an LC filter 24 comprising an inductor 26 and a capacitor 28. A load 30 is connected across the output terminals 32, 34 of the power supply. A free-wheeling diode 21 is connected between the input of inductor 26 and ground to provide a path for the inductive current when the SCR's are not conducting.

Connected across the load is a potentiometer and voltage divider 36 comprising resistor 38 and 40. A first feedback loop is formed by potentiometer 36 and a voltage reference diode 44 which provides a constant voltage drop normally in the range of 6 to 12 volts. The potentiometer slider 42 is set at a point to provide the desired D.C. output voltage. This point is selected so that the voltage $V_2$ at point $b$ is slightly negative, thereby causing the blocking oscillator 22 to provide firing pulses at such points in time that the SCR's 14 and 16 fire at the appropriate angle of their corresponding half cycles of $V_{AC}$ in order to produce the desired regulated D.C. output in accordance with the setting of slider 42. Should the D.C. output voltage vary because of a change in load, voltage $V_2$ also varies to control the timing of the firing pulses produced by blocking oscillator 22.

Let us now look at blocking oscillator 22 in more detail. The oscillator comprises a PNP transistor 46 and a transformer 50 which has wound thereon a plurality of windings. An input winding 48 is connected between the base of transistor 46 and the various feedback loops to be described below. This winding also acts as the feedback winding to provide conventional blocking oscillator operation in conjunction with the output winding 52 across which is connected a diode rectifier 54 for suppressing the flyback voltage from transformer 50. Also wound on the transformer is a pair of control windings 56 and 58 which are connected through resistors 60 and 62, respectively to the gate electrodes of their corresponding silicon controlled rectifiers 14 and 16. A timing capacitor 64 is connected between the base and emitter electrodes of transistor 46.

The frequency of operation of blocking oscillator 46 is determined by the value of the voltage $V_3$ on the base of the transistor. When $V_3$ is positive, the transistor is non-conducting and when the base voltage goes negative, the transistor is rendered conducting and driven into saturation to induce pulses in windings 56 and 58 which are applied to the gate electrodes of the silicon controlled rectifiers. As soon as transistor 46 becomes conducting, a large positive current flows between the base and emitter electrodes of transistor 46 thereby charging the timing capacitor 64 to a positive potential. The frequency of the oscillator is determined by the time constant of the capacitor 64 and resistors 47 and 49, that is, the point in time at which the voltage $V_3$ becomes negative. As mentioned before, as long as the base voltage is positive, the transistor is non-conducting; however, when voltage $V_3$ goes negative as capacitor 64 discharges through resistors 47 and 49 towards $V_2$ (which is determined by the D.C. output voltage, wiper arm 42 and the voltage drop across Zener diode 44), transistor 46 is once again driven into conduction to provide firing pulses to the SCR's.

We will now return to the operation of the first feedback loop including the potentiometer 36 and Zener diode 44. Let us assume that the output voltage increases above the preset value. Then, voltage $V_2$ will become less negative and render transistor 46 non-conducting for a longer period of time since it will now take longer for capacitor 64 to discharge to a negative value. Consequently, the SCR's will be fired later in their respective half cycles thereby reducing the D.C. output voltage. In like manner, should the output voltage fall below the predetermined value, voltage $V_2$ will become more negative to hasten the discharge of capacitor 64 towards a negative value thereby increasing the frequency of operation of blocking oscillator 22 so that the SCR's in bridge 12 are fired earlier in their respective half cycles to increase the output voltage.

With only this first feedback loop in the circuit, regulation is obtained but the firing of the SCR's is very erratic, resulting in a high output ripple and the danger of a large D.C. component in the secondary winding of the power transformer 10. This large D.C. component could saturate the transformer which of course is not permissible. For example, at start-up time, the output voltage is zero and therefore the very large error voltage would render the SCR's conducting for their maximum period of time in each half cycle resulting in a large surge of current through the filter inductor 26. Even after start-up, overshooting results since the response of the regulating circuit lags behind the actual variations in load voltage. Since this effect is cumulative, it is possible that twice the preset load voltage may be developed across the load.

In order to eliminate this instability, a phase advancing feedback capacitor 66 is connected between the output of the ripple filter 24 and the base circuit of transistor 46. Because of the presence of this capacitor 66, voltage $V_3$ will include a component which is responsive to the slope or transient of the output voltage variations. For example, if there should be a momentary increase in D.C. output voltage, the derivative feedback provided by capacitor 66 will aid the feedback from potentiometer 36 and provide an immediate positive voltage to the base of transistor 46 thereby improving the response of the regulating circuit. In the same manner, as the D.C. output voltage returns to its preset value, the slope of the variation will be negative and the capacitor 66 will add a negative voltage or subtractive voltage component to $V_3$ so that the regulating circuit does not cause overshooting. That is, without the presence of capacitor 66, the base of transistor 46 will not become negative until a later time than with the presence of capacitor 66. Because of the positive slope of the output voltage at start-up, the output voltage is presented from surging to an extremely high level by the presence of capacitor 66 which regulates the output to produce a slowly rising ramp.

The regulating circuit incorporating capacitor 66 gives the power supply an extremely fast transient response with less than one-half cycle delay in the regulator circuit and a wide range of stable operation with respect to both input and output voltage. This improved regulator circuit also automatically limits the current surge through bridge 12 due to charging the filter capacitor 28 during start-up. Consequently, surge current protection networks are unnecessary.

A third feedback loop incorporating a phase shifting circuit including the resistor 68 and a capacitor 70 may be connected between the input sides of the LC filter 24 and the base circuit of transistor 46 through a coupling capacitor 72. This circuit insures stable operation for all values of $V_{AC}$ and $V_{DC}$, the output voltage. The addition of the derivative feedback capacitor 66 assures stable operation within a limited range. However, undesirable each second half cycle firing of the SCR's may occur when the R.M.S. value of $V_{AC}$ is within a few percent of $$V_{AC} = \frac{\pi}{2} V_{DC} \qquad (1)$$

This behavior is explained by the phase shift introduced by LC filter 24. A voltage $V \cdot e^{j\omega t}$ at point "a" in FIGURE 2 is attenuated to $V_0 e^{j\omega t}$ at the output terminals where $$V_0 = \frac{V}{1 - w^2 L_1 C_1 + j\frac{wL_1}{R_L}} \qquad (2)$$

where $R_L$ is the total load on the output terminals, $L_1$ is the inductance of filter inductor 26 and $C_1$ is the capacitance of the filter capacitor 28. If the supply voltage is 60 c.p.s., the first harmonic of $V_1$ at point "a" is also 60 c.p.s. and the phase shift using Equation 2 is 178.1° if $R_L=1$, $L_1=5$ mh. and $C=0.08f$. Higher harmonics of $V_1$ are attenuated so much that they can be neglected. The almost 180° phase shift tries to maintain the each second half cycle firing which is caused by the fact that the 60 cycle ripple voltage goes positive each second half cycle, thus preventing firing during this half cycle.

However, each second half cycle firing is completely eliminated by a third feedback loop consisting of the capacitors 72 and 70 and resistor 68. It is noted that this feedback loop is connected between the bridge circuit 12 and filter capacitor 24, that is, before the 180° phase shift introduced by the filter. An almost 90° phase shift of the first harmonic of $V_1$ is obtained by means of the RC network resistor 68 and capacitor 70. The 90° phase shifted and attenuated harmonics are fed to the input of blocking oscillator 22 via the coupling capacitor 72 connected to the base circuit of transistor 46. The phase shift of the total feedback signal to the blocking oscillator now differs considerably from 180° and correct operation, that is, approximately a 90° firing angle for each half cycle of $V_{AC}$, is now obtained even if Equation 1 is satisfied.

Even though the A.C. ripple is fed back by the two capacitive loops, there is no deleterious effect on the operation of the regulating circuit. Furthermore, it is suggested that this ripple actually improves the firing stability of the system.

Capacitors 66, 68, 70, and 72 are in effect connected in parallel with the timing capacitor 64 and therefore their values must be considered in the operation of blocking oscillator 22. The capacitances of all these capacitors actually affect the operation of the blocking oscillator 22 and their discharge time through resistors 49 and 47 to the −12 volt supply will affect the frequency of operation of the blocking oscillator and therefore the values of all the capacitors must be taken into consideration in the design of oscillator 22.

Of course, power transformer 10 is not necessary to the operation of this invention, since this transformer merely provides ground isolation and voltage transformation.

The regulator circuit shown in FIGURE 2 can be used with any SCR circuit such as bridge circuits, a transformer with center tap, etc. Furthermore, even though the blocking oscillator is highly desirable as a source of firing pulses of high power, other firing circuits are contemplated such as transistor multivibrators, magnetic firing circuits and unijunction transistor firing circuits. Also within the purview of this invention is an equivalent circuit employing thyratrons instead of silicon controlled rectifiers. In fact, any phase controlled switching means for providing rectification and load control may be used in combination with the regulator circuit embodying this invention.

FIGURE 3 shows typical regulation characteristics of the circuit of FIGURE 2. The regulation between 4 and 11 amperes output current is very good. The input voltage $V_{AC}$ can easily be compensated for with well known circuit techniques.

FIGURE 4 shows a stability diagram for the circuit in FIGURE 2. It is seen that for a given output voltage $V_{DC}$, the input voltage $V_{AC}$ can be varied in a ratio of approximately 1 to 2. Furthermore, for a given $V_{AC}$, $V_{DC}$ can be varied in approximately the ratio of 1 to 4. Stability diagrams were made for the circuit in FIGURE 2 with different values for the various components. These tests have proven that the circuit is not sensitive to component changes. The regulator circuit is therefore easy to design and has an inherent high reliability.

Values for the components utilized in the preferred embodiment shown in FIGURE 2 are listed in the following table.

| Component: | Value |
|---|---|
| SCR 14 and 16 | 2N684 |
| Zener Diode 44 | 1N751 |
| Diodes 18, 20, 21 | 1N249 |
| Diode 54 | 1N270 |
| Transistor 46 | 2N526 |
| Inductor 26 mh | 5 |
| C28 farad | 0.08 |
| C64 µf | 0.57 |
| C66 µf | 1 |
| C70 µf | 100 |
| C72 µf | 1 |
| R38 | 1K |
| R40 ohms | 200 |
| R47 | 22K |
| R49 | 2K |
| R51 ohms | 100 |
| R60 and R62 do | 27 |

What has been described above is a preferred embodiment of the present invention, various minor modifications and changes therein will be apparent to those skilled in the art to which this invention pertains. Since the disclosed embodiment is intended to be illustrative only and not in any way limiting, such modifications and changes are deemed to be within the the spirit and scope of the present invention which is limited only as defined in the following claims.

What is claimed is:

1. A highly stable regulated power supply for converting an A.C. input to a constant D.C. output comprising means to rectify an A.C. input, a pair of phase sensitive switches operative upon alternate half cycles of the A.C. input for controlling the magnitude of the D.C. output, a phase shifting smoothing filter connected between said switches and the output terminals of said supply, a transistor blocking oscillator producing pulses for opening and closing said switches, a first resistive feedback loop connected to the D.C. output for applying a first D.C. error signal to the input of said blocking oscillator, a second capacitive feedback loop connected to the D.C. output for applying a second derivative error signal to the input of said blocking oscillator, and a third phase shifting loop connected between said pair of switches and said filter for applying a third phase shifted error signal to the input of said blocking oscillator whereby the frequency of said oscillator is varied in accordance with said first, second, and third error signals to provide highly stable operation over a wide range of A.C. inputs and D.C. outputs.

2. A stabilized regulated power supply with high speed transient response comprising in combination means for rectifying an A.C. input voltage, a pair of silicon controlled rectifiers each connected to be fired on alternate half cycles of the rectified input voltage, a transistor blocking oscillator having its output connected to the gate electrodes of said silicon controlled rectifiers, the output pulses of said oscillator serving as firing pulses for said silicon controlled rectifiers, a signal responsive control means for varying the frequency of said oscillator, a pair of load terminals connected to the output of said silicon controlled rectifiers, settable potentiometer means connected between said load terminals and said control means for feeding to said control means a first signal corresponding to the magnitude of the load voltage relative to reference voltage determined by the setting of said potentiometer means, and phase advancing derivative feedback means connected between said load terminals and said control means for feeding to said control means a second signal responsive to the slope of any deviation of the output voltage from the reference voltage.

3. A stabilized regulated power supply as defined in claim 2 further comprising a phase shifting smoothing filter connected between the output of said silicon controlled rectifiers and said load terminals, and a phase shifting network connected between the output of said silicon controlled rectifiers and said control means to feed a third signal to said control means whereby the resultant phase shift between said A.C. input and the resultant signal applied to said control means is substantially different from 180°.

4. In an A.C. to D.C. regulated power supply system for converting an A.C. input voltage to a D.C. output voltage for application to a load, the combination comprising: a phase sensitive switching means adapted to be connected to an A.C. input voltage; an LC smoothing filter connected between said switching means and a load connected to the output of said system; a pulse generating means having its output connected to said phase sensitive switching means for timing the operation of the switching means relative to the period of the A.C. input voltage to control the D.C. output voltage; first feedback means connected to the D.C. output for deriving a first error signal corresponding to the magnitude and direction of a deviation of the D.C. output voltage from a desired value; means to feed said first error signal to said pulse generating means to control the frequency of operation thereof and thereby the timing of the operation of said switching means; a capacitor connected between the D.C. output and the input of said pulse generating means to provide a phase advanced second error signal corresponding to the slope of the deviation and which modifies the first error signal to render the regulation of the load voltage responsive to the slope of any undesired deviation, thereby eliminating overshooting and excessive current surges; and a phase shifting network connected between said pulse generating means and the juncture of said phase sensitive switching means and said filter further to modify said first D.C. error signal to eliminate each second half cycle firing of said phase switching means.

References Cited by the Examiner
UNITED STATES PATENTS

| | | | |
|---|---|---|---|
| 2,477,946 | 8/1949 | Smith | 321—16 |
| 3,176,212 | 3/1965 | De Puy | 323—22 |
| 3,185,912 | 5/1965 | Smith et al. | 321—18 |
| 3,221,241 | 11/1965 | Greenberg et al. | |

JOHN F. COUCH, *Primary Examiner.*

M. L. WACHTELL, *Assistant Examiner.*